United States Patent [19]
Miller

[11] Patent Number: 5,623,409
[45] Date of Patent: Apr. 22, 1997

[54] METHOD AND APPARATUS FOR NON-LINEAR DAMPING OF AN ELECTRIC ASSIST STEERING SYSTEM FOR VEHICLE YAW RATE CONTROL

[75] Inventor: Joseph D. Miller, Farmington Hills, Mich.

[73] Assignee: TRW Inc., Lyndhurst, Ohio

[21] Appl. No.: 331,962

[22] Filed: Oct. 31, 1994

[51] Int. Cl.$^6$ ...................................................... B62D 5/04
[52] U.S. Cl. .................... 364/424.051; 180/443; 180/446; 318/432; 318/434; 74/388 PS
[58] Field of Search .................. 384/424.05, 424.01; 180/79.1, 140, 144.2, 443, 444, 445, 446, 408, 410; 74/388 PS; 318/696, 701, 721, 432, 434

[56] References Cited

U.S. PATENT DOCUMENTS

| | | | |
|---|---|---|---|
| 4,107,595 | 8/1978 | Campe | 318/696 |
| 4,415,054 | 11/1983 | Drutchas | 180/79.1 |
| 4,621,327 | 11/1986 | Dolph et al. | 364/424.05 |
| 4,651,840 | 3/1987 | Shimizu et al. | 180/79.1 |
| 4,660,671 | 4/1987 | Behr et al. | 180/142 |
| 4,666,013 | 5/1987 | Shibahata et al. | 180/141 |
| 4,670,696 | 6/1987 | Byrne et al. | 318/701 |
| 4,695,780 | 9/1987 | Kurakake et al. | 318/561 |
| 4,708,220 | 11/1987 | Noto et al. | 364/424.05 |
| 4,735,271 | 4/1988 | Shimizu | 180/79.1 |
| 4,771,843 | 9/1988 | Shimizu | 180/79.1 |
| 4,794,997 | 1/1989 | North | 180/79.1 |
| 4,819,170 | 4/1989 | Shimizu | 364/424.05 |
| 4,830,127 | 5/1989 | Ito et al. | 364/424.01 |
| 4,868,477 | 9/1989 | Anderson et al. | 318/696 |
| 4,896,089 | 1/1990 | Kliman et al. | 318/701 |
| 4,934,472 | 6/1990 | Bloor et al. | 180/79.1 |
| 4,961,038 | 10/1990 | MacMinn | 318/696 |
| 5,012,172 | 4/1991 | Sember | 318/696 |
| 5,038,090 | 8/1991 | Kawabata et al. | 318/721 |
| 5,040,629 | 8/1991 | Matsuoka et al. | 180/79.1 |
| 5,072,166 | 12/1991 | Ehsani | 318/696 |
| 5,075,608 | 12/1991 | Erdman et al. | 318/599 |
| 5,257,828 | 11/1993 | Miller et al. | 364/424.05 |
| 5,406,155 | 4/1995 | Persson | 310/68 B |

FOREIGN PATENT DOCUMENTS

| | | |
|---|---|---|
| 60-154955 | 8/1985 | Japan . |
| 60-114574 | 5/1989 | Japan . |
| 2170157 | 7/1986 | United Kingdom . |
| 2205287 | 12/1988 | United Kingdom . |

OTHER PUBLICATIONS

Article entitled "A State Observer for Variable Reluctance Motors: Analysis and Experiments", 19th Asilomer Conference on Circuits, Systems & Computers Nov. 6–8, 1995.
Article entitled "A Simple Motion Estimator for VR motor" by W. D. Harris and J. H. Lang, Ieee Industry Applications Society Annual Meeting, Pittsburgh, PA, Oct., 1988, pp. 387–393.

Primary Examiner—Kevin J. Teska
Assistant Examiner—Tan Nguyen
Attorney, Agent, or Firm—Tarolli, Sundheim, Covell, Tummino & Szabo

[57] ABSTRACT

An electric assist steering system (10) comprises a steering torque sensor (110) and an electric assist variable reluctance motor (26) operatively connected to a steering member (20). A motor control signal is provided in response to a value of the torque signal for control of the assist motor. A motor velocity sensor (200) senses velocity of the power assist motor and a vehicle speed sensor (119) senses the vehicle speed. A control circuit (220, 210, 142) modifies the motor control signal in response to the sensed motor velocity and the sensed vehicle speed signal so as to provide non-linear damping of the motor for vehicle yaw rate control.

12 Claims, 8 Drawing Sheets

METHOD AND APPARATUS FOR NON-LINEAR DAMPING OF AN ELECTRIC ASSIST STEERING SYSTEM FOR VEHICLE YAW RATE CONTROL

TECHNICAL FIELD

The present invention is directed to an electric assist steering system and is particularly directed to a method and apparatus for controlling an electric assist steering system.

BACKGROUND OF THE INVENTION

There are many known power assist steering systems for automotive vehicles. Some provide steering assist by using hydraulic power and others by using electric power.

Electric power assist steering systems that utilize a rack and pinion gear set provide power assist by using an electric motor to either (i) apply rotary force to a steering input shaft connected to a pinion gear, or (ii) apply linear force to a steering member having the rack teeth thereon. The electric motor in such systems is typically controlled in response to (i) a driver's applied torque to the vehicle steering wheel, and (ii) sensed vehicle speed.

In U.S. Pat. No. 3,983,953, an electric motor is coupled to the input steering shaft and energized in response to the torque applied to the steering wheel by the vehicle operator. An electronic control system includes a torque sensor and uses the output of a vehicle speed sensor. A computer receives the output signals provided by both sensors. The computer controls the amount of the assistance provided by the motor in response to the applied steering torque and the sensed vehicle speed.

U.S. Pat. No. 4,415,054 (now U.S. Reissue Pat. No. 32,222, hereinafter, "the Drutchas steering gear") utilizes a D.C. electric assist motor driven through an H-bridge arrangement. The motor includes a rotatable armature encircling a steering member. The steering member has a thread convolution portion and a portion having straight cut rack teeth thereon. Rotation of the electric assist motor armature causes linear movement of the steering member through a ball-nut drive arrangement in combination with the thread convolution portion of the steering member. A torque sensing device is coupled to the steering column to sense driver applied input torque to the steering wheel. The torque sensing device uses a magnet Hall-effect sensor arrangement for sensing relative rotation between the input and pinion shafts across a torsion bar. An electronic control unit monitors the signal from the torque sensing device and controls the electric assist motor in response thereto.

U.S. Pat. No. 4,660,671 discloses an electric controlled steering system that is based on the Drutchas steering gear. In accordance with the '671 patent, a D.C. motor is axially spaced from the ball-nut and is operatively connected thereto through a connection tube. The electronic control unit includes a plurality of diagnostic features that monitor the operation of the steering system. If an error in the operation of the electric steering system is detected, the electric assist system is disabled and steering reverts to an unassisted mode.

Hydraulic power assist steering systems have an inherent yaw damping characteristic during a steering maneuver. Such damping characteristic in a power assist steering system is particularly important when the vehicle is traveling at a relatively high speed. It is, therefore, desirable to provide such a yaw damping characteristic in an electric assist steering system that would, at least, simulate that provided by a hydraulic power assist steering system and, preferably, improve thereupon.

A prior art electric assist steering system provided damping by switching a load resistor across the electric assist motor when the vehicle speed exceeded a predetermined value. When the vehicle speed was below the predetermined value or when applied steering torque exceeded a predetermined amount, the resistor was disconnected from across the motor. This method of damping was used to control the yaw rate of the vehicle when the road wheels returned after a turn.

SUMMARY OF THE INVENTION

The present invention is directed to an electric assist steering system that provides a non-linear damping characteristic in response to the sensed rotational rate of the electric assist motor. The damping characteristic is adjusted in response to the sensed vehicle speed so that damping increases as sensed vehicle speed increases.

In accordance with one aspect of the present invention, an apparatus is provided for controlling as electric assist steering system. The apparatus comprises torque sensor means for sensing applied steering torque and providing an applied steering torque signal indicative thereof. Means provides a torque demand signal having a value functionally related to the applied steering torque. An electric assist motor is operatively connected to a steering member for, when energized, providing steering assist. A motor control signal is provided in response to the torque demand signal. Motor speed sensor means senses speed of the electric assist motor and provides a motor speed signal indicative thereof. Means modifies the motor control signal in response to the motor speed signal so as to provide non-linear damping of the motor.

In accordance with a preferred embodiment of the present invention an electric assist steering system comprises torque sensor means for sensing applied steering torque and providing a torque signal having a value indicative of the applied steering torque. Means provides a torque demand signal having a value functionally related to the applied steering torque. An electric assist variable reluctance motor is operatively connected to a steering member for, when energized, it provides steering assist. The variable reluctance motor has a rotor and a stator. Rotor position relative to the stator is sensed and motor speed is derived therefrom. A motor control signal is provided in response to torque demand signal. Vehicle speed sensing means are provided for sensing vehicle speed and for providing a vehicle speed signal indicative thereof. The electric assist steering system further comprises means for modifying the motor control signal in response to the motor speed and the vehicle speed signal so as to provide damping as a non-linear function of both the sensed motor speed and the vehicle speed.

In accordance with another aspect of the present invention, a method for controlling an electric assist steering system is provided including the steps of (a) sensing applied steering torque and providing an applied steering torque signal indicative thereof; (b) providing a torque demand signal having a value functionally related to the applied steering torque; (c) providing an electric assist motor operatively connected to a steering member for, when energized, providing steering assist; (d) providing a motor control signal in response to the torque demand signal for control of the motor; (e) sensing speed of the electric assist motor and providing a motor speed signal indicative thereof; and (f) modifying the motor control signal in response to the motor speed signal so as to provide non-linear damping of the motor.

BRIEF DESCRIPTION OF THE DRAWINGS

Further features and advantages of the present invention will become apparent to those skilled in the art to which the present invention relates from reading the following detailed description with reference to the accompanying drawings, in which.

DESCRIPTION OF PREFERRED EMBODIMENT

Figure 1:
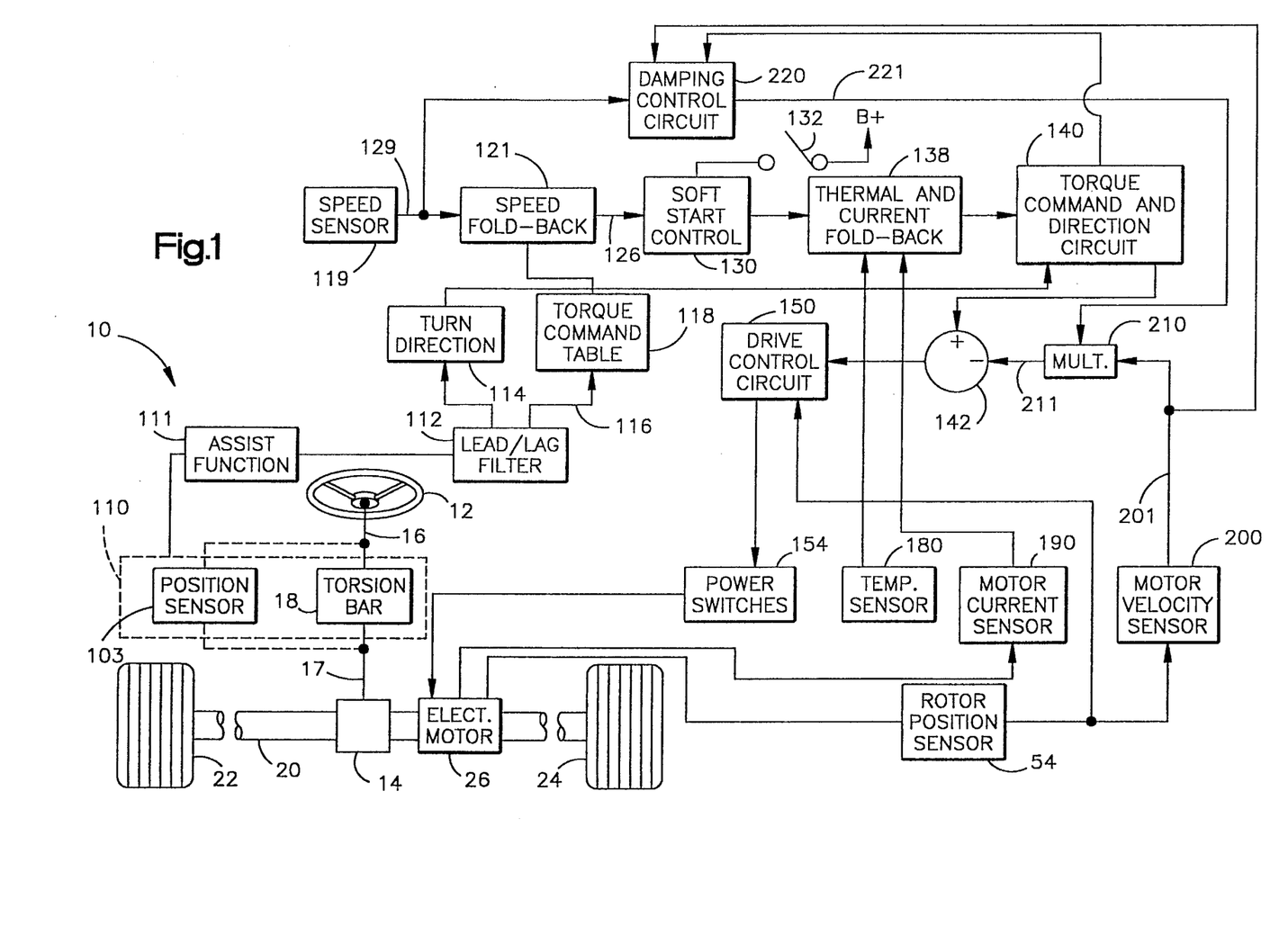
FIG. 1 is a schematic block diagram illustrating a power assist steering system in accordance with the present invention.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to a pinion shaft 17. The input shaft 16 is operatively coupled to the pinion shaft 17 through a torsion bar 18. The torsion bar 18 twists in response to applied steering torque thereby permitting relative rotation between the input shaft 16 and the pinion shaft 17. Stops of a type well known in the art limit the amount of such relative rotation between the input and pinion shafts.

The pinion gear 14 has helical teeth which are meshingly engaged with straight cut teeth on a rack or linear steering member 20. The pinion gear in combination with the straight cut gear teeth on the rack member form a rack and pinion gear set. The rack is steerably coupled to the vehicle's steerable wheels 22, 24 with steering linkage in a known manner. When the steering wheel 12 is turned, the rack and pinion gear set converts the rotary motion of the steering wheel into linear motion of the rack. When the rack moves linearly, the steerable wheels 22, 24 pivot about their associated steering axis and the vehicle is steered.

An electric assist motor 26 is drivingly connected to the rack 20. When the electric motor 26 is energized, it provides power assist so as to aid in the rotation of the vehicle steering wheel by the vehicle operator. In accordance with a preferred embodiment of the present invention, the electric assist motor is a variable reluctance motor. A variable reluctance motor is desirable for use in an electric assist steering system because of its small size, low friction, and its high torque-to-inertia ratio.

Figure 2:
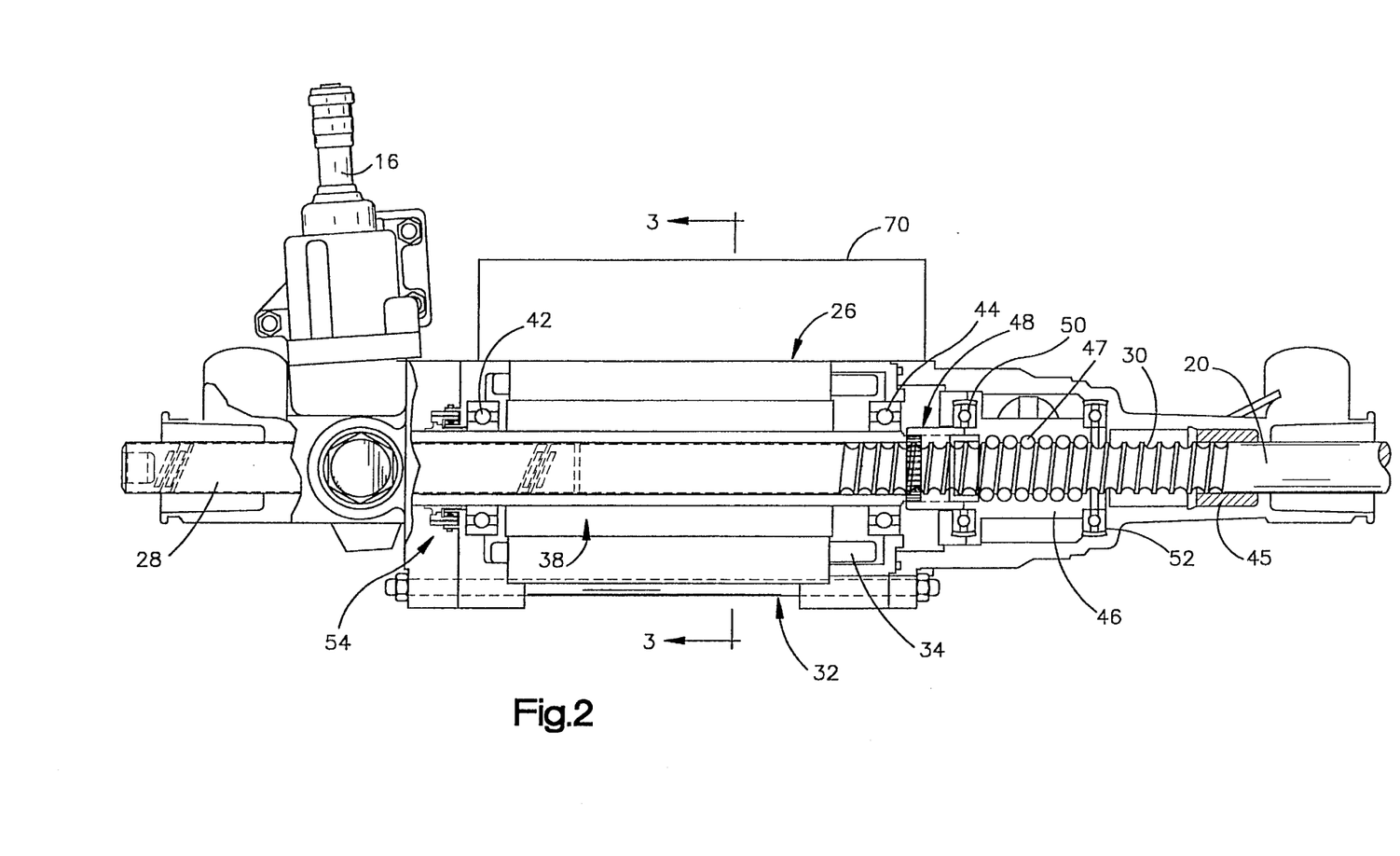
FIG. 2 is a plan view partially in section of a portion of the power assist steering system of FIG. 1.
Figure 3:
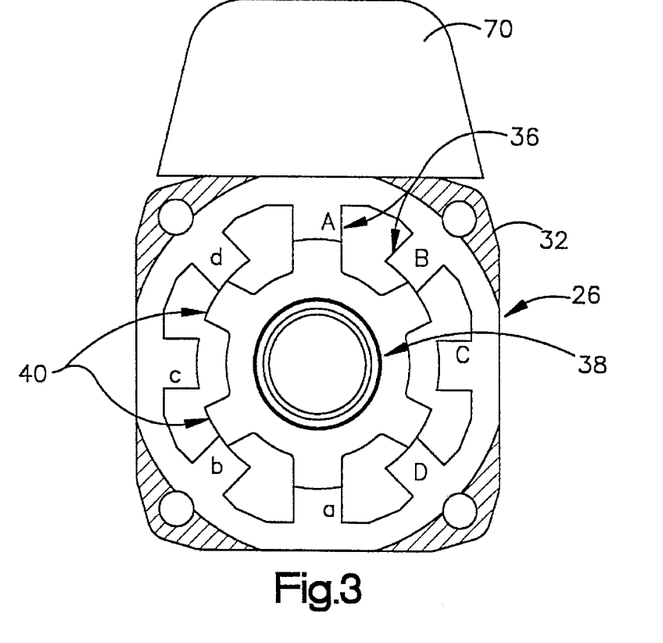
FIG. 3 is a cross section view as seen from the line 3—3 of FIG. 2.

Referring to FIGS. 2 and 3, the rack 20 has a straight rack tooth portion 28 in meshing engagement with the pinion gear. The rack 20 also has a threaded convolution portion 30. The variable reluctance motor 26 circumscribes the rack 20 and is mounted in a motor housing 32. The motor 26 includes a plurality of stator windings 34, each one wrapped about its associated stator pole 36. The motor 26 also includes a rotor 38 having a plurality of rotor poles 40. In a preferred embodiment of the present invention, the variable reluctance motor includes eight stator poles and six rotor poles. The stator poles are arranged so as to be energizes in pairs designated Aa, Bb, Cc, and Dd.

The operation of a variable reluctance motor and its principle of operation are well known in the art. Basically, the stator poles are energized in pairs. The rotor moves so as to minimize the reluctance between the stator poles and the rotor poles. Minimum reluctance occurs when a pair of rotor poles are aligned with the energized stator poles. Once minimum reluctance is achieved, i.e., when rotor poles align with a pair of energized stator coils, those energized stator coils are de-energized and an adjacent pair of stator coils are energized. The direction of motor rotation is controlled by the sequence in which the stator coils are energized. The torque produced by the motor is controlled by the current through the stator coils. U.S. Pat. No. 5,257,828, to Miller et al., and assigned to TRW Inc, the specification of which is hereby fully incorporated herein by reference, discloses a control arrangement for variable reluctance motor.

The motor 26 is mounted in the motor housing 32 and rotatably supports the rack 20 through bearings 42, 44. The rack is also supported by the pinion gear and bearing 45. The motor rotor is drivingly connected to a ball-nut drive arrangement 46 through a connection tube 48. The ball-nut drive arrangement 46 circumscribes the threaded convolution portion 30 of the rack 20 with the nut portion being operatively connected to the threaded convolution portion of the rack through a plurality of balls 47. Such an arrangement is fully described in the above-mentioned Drutchas U.S. Pat. No. 4,415,054, now U.S. Reissue Pat. No. 32,222, assigned to TRW Inc., and which is hereby fully incorporated herein by reference.

When the motor is energized, the rotor turns which, in turn, rotates the nut portion of the ball-nut drive arrangement. When the nut rotates, the balls transfer a linear force to the rack. The direction of rack movement is dependent upon the direction of rotation of the motor. The nut 46 is rotatably supported in the housing 32 by thrust bearings 50, 52.

A motor position sensor 54 is operatively connected between the motor rotor and to the motor stator. The function of the motor position sensor 54 is to provide an electrical signal indicative of the position of the rotor relative to the stator. For proper operation of the variable reluctance motor, including direction of rotation and applied torque, it is necessary to know the position of the rotor relative to the stator.

In the preferred embodiment of the present invention, a physical rotor position sensor is provided. It is known in the art that the rotor position can be determined by means other than a physical position sensor. For example, it is possible to monitor the current through the de-energized stator coils and, based upon the sensed current, the rotor position is determined. One specific arrangement for sensing rotor position without a separate position sensor is disclosed in U.S. Pat. No. 5,072,166, which is hereby fully incorporated herein.

Figure 4:
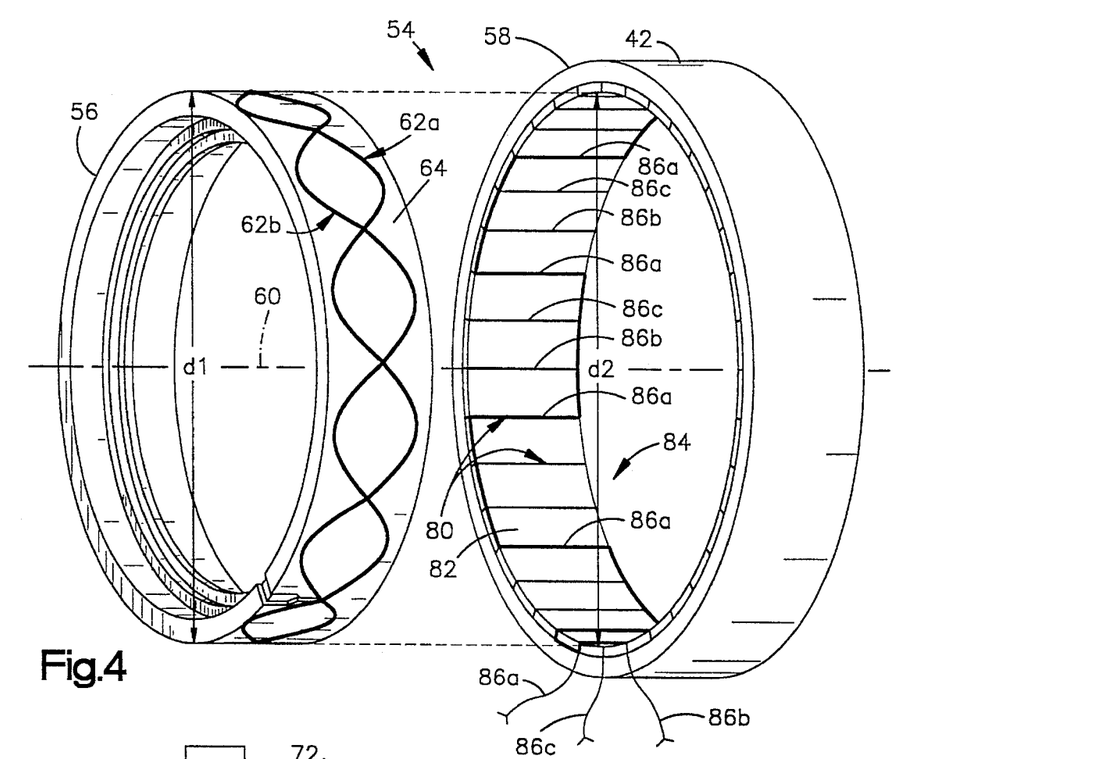
FIG. 4 is an isometric exploded view of the motor position sensor shown in FIG. 1.

Referring to FIGS. 4–8, the structure and operation of a preferred rotor position sensor 54 will be appreciated. The rotor position sensor 54 includes a transmitting ring 56 and a receiving ring 58. The rings shown in FIG. 4 are axially offset for clarity. In their assembled position, shown in FIG. 5, the rings are mounted so as to be concentric (nested) about a common axis 60. The rings 56, 58 are preferably made from a magnetically permeable material that will support magnetic flux in the 200 kHz frequency range. The permeability of such material preferably exceeds 10 at this frequency. Magnetically permeable materials that exhibit such characteristics include powdered iron, soft ferrites, and ferrite filled plastic. The magnetically permeable material provides a return path for the magnetic circuits associated with the transmitting and receiving rings. In addition, the magnetically permeable material provides filtering of EMF interference from outside sources, and even from the operation of the motor itself.

The transmitting ring 56 has an outer diameter d1. The receiving ring 58 has an inner diameter d2. The diameter d1 is less than the diameter d2 so that a relatively small air gap exists between the two rings when they are assembled in their concentric or nested arrangement.

The transmitting ring 56 is coaxially secured to the rotor 38. The transmitting ring 56 has two sinusoidal grooves 62a and 62b cut in its outer surface 64. The sinusoidal grooves 62a and 62b are 180 electrical degrees out of phase. The orientation of the grooves 62a and 62b are referred to as being a circumferentially varying sinusoidal pattern.

A transmitting coil 66 is disposed in the grooves 62a and 62b around the entire circumference of the ring 56. The transmitting coil 66 comprises two conductive electrical tracks 68a and 68b being disposed in the grooves 62a and 62b, respectively. The conductive electrical tracks 68a and 68b are electrically insulated from each other and from the ring 56. Preferably, the depth of the grooves 62a and 62b and the dimension of the conductors 68a and 68b are such that, once assembled, the conductors 68a and 68b are flush with the outer surface 64. Each conductive electrical track 68a and 68b is arranged in a circumferentially varying sinusoidal pattern, with a 180° relative offset between the two patterns. The sinusoidal patterns of the conductive electrical tracks 68a and 68b can be expressed by the following equations:

$$C_{46a} = D\sin(6\alpha)$$

$$C_{46b} = D\sin(6\alpha + 180)$$

where C equals the axial position of the pattern along a circumferential reference axis 70, D equals the peak value of the distance of the pattern from the circumferential reference axis 70, and α equals the mechanical angle in degrees. The number six is the spatial frequency of the patterns, with each pattern undergoing a 360° phase change every sixty mechanical degrees. The patterns repeat every sixty mechanical degrees, corresponding to the number of rotor poles 40 of the motor 26.

Figures 7A, 7B:
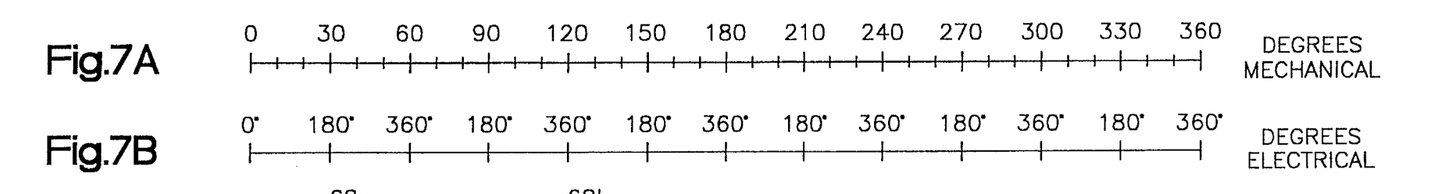
FIGS. 7A and 7B are scales showing the relationship of mechanical degrees of motor rotation and electrical degrees of motor rotation for the motor of FIG. 1.
Figures 7C, 7D:
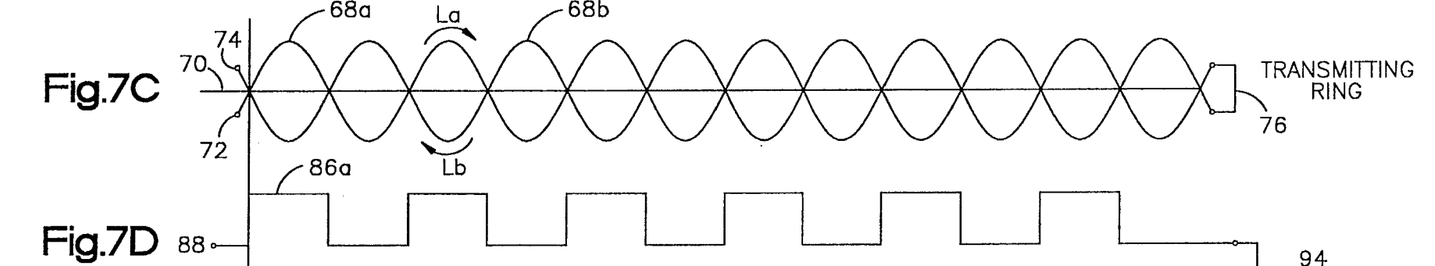
FIGS. 7C–7G of graphical representations of electrical signals present during one revolution of the position sensor of FIG. 4.

FIGS. 7A and 7B depict a scale of mechanical degrees of the ring 56 and a scale of electrical degrees of the ring 56, respectively. FIG. 7C illustrates the sinusoidal patterns of the conductive electrical tracks 68a and 68b. The two conductive electrical tracks 68a and 68b have first connection terminals 72 and 74, respectively. A common connection terminal 76 joins the other connection terminal of the tracks. As a result, the instantaneous current in conductive electrical track 68a is in a direction opposite to that in track 68b. The effect of the two circumferentially varying sinusoidal patterns is a well defined instantaneous magnetic flux pattern of alternating positive and negative potentials in the respective areas bounded by the two conductor patterns.

In accordance with one embodiment of the position sensor, the transmitting ring 56 is made from a powdered iron toroid. The two grooves 62a and 62b are machined in the outer surface 64 of the toroid to form the sinusoidal patterns previously described. A wire is laid in each of the grooves to form the conductive electrical tracks 68a and 68b. The grooves 62a and 62b are slightly tapered in an inward radial direction to hold the wires therein. In addition, an adhesive is applied to secure the wires in place. One of the groove depths is greater than the other to avoid pressure at the intersection points of the two wires. In this embodiment, it is desirable to keep the wires as close to the surface of the ring 56 as possible to assure a well-defined magnetic pattern is transmitted.

In accordance with an alternative embodiment of the position sensor, the transmitting ring 56 includes conductors 68a and 68b secured to the outer surface 64 of the ring 56 in the sinusoidal pattern through electroplating, plasma deposition, sputtering methods, or other similar techniques known to those skilled in the art. The deposition of the conductors in this embodiment must be done sequentially. An insulating layer must first be deposited on the ring 56, followed by one of the sinusoidal conductor patterns, then a second insulating layer, and finally the second sinusoidal conductor pattern. Alternatively, a single layer deposition can be used if an insulated bridge is provided for one of the sinusoidal conductors at each of the intersections or cross over locations between the two conductors.

Another alternative embodiment of the transmitting ring 56 utilizes a two layer flexible linear circuit. The sinusoidal pattern is created on a two layer flexible linear circuit board having a mean length which fits around the circumference of the ring 56. The flexible linear circuit is then bonded to the outer surface 64 of the ring 56 using adhesive methods known to those skilled in the art.

Yet, another alternative embodiment of the transmitting ring 56 is made of a moldable soft ferrite material with a plurality of radially raised, foot-ball shaped, lands or bobbins. The radially raised bobbins form a border for sinusoidal patterns similar to the patterns described above. Each radially raised bobbin is referred to as a pole. An insulated wire is wound around the poles in a first direction, following a sine pattern, around the entire circumference of the ring. The insulated wire is then wound around the poles in the other direction following a 180° shifted sine pattern to the original starting terminal. The number of windings of the insulated wire may be repeated to yield an increased turns ratio. The outer diameter of the raised pole ring must be less than the inner diameter of a receiving ring to insure an air gap between the transmitting ring and the receiving ring.

There are several benefits that result from a raised pole design. First, the raised pole design allows for manufacture through low cost molding techniques, and is readily producible in large volumes. The raised poles also allow for the use of conventional winding techniques in mounting the wire on the transmitter ring thereby resulting in further cost advantages. Finally, the raised poles provide a magnetically focused field area and, therefore, improve the efficiency of the transmitting ring.

Figure 5:
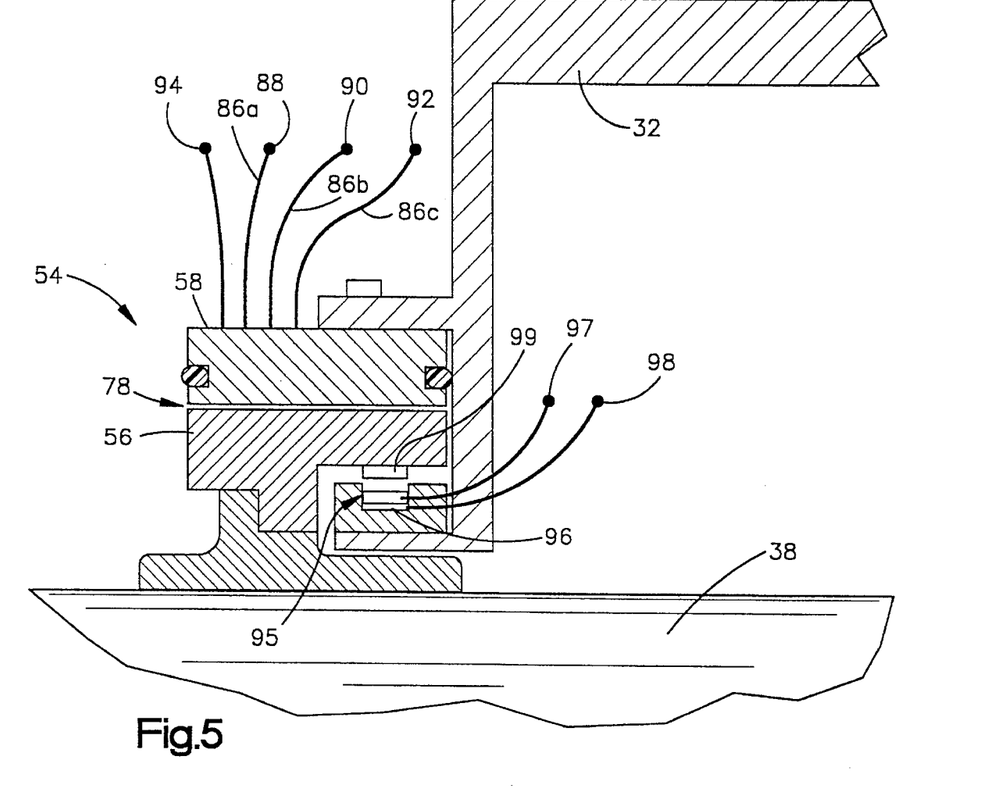
FIG. 5 is a side sectional view of a portion of the motor position sensor of FIG. 4.

The receiving ring 58 is mounted to the motor stator and, in turn, to the housing 32 in a coaxial relationship with the transmitting ring 56 so that the transmitting ring 56 is nested inside of the receiving ring 58. The radial proximity of the ring 56 and ring 58 provides electromagnetic coupling therebetween so as to form a rotary transformer 78.

The receiving ring 58 has a plurality of parallel conductive tracks 80 cut into its inner surface 82. A plurality of receiving coils 84 are wound in these tracks. Specifically, the receiving coils 84, in accordance with one embodiment of the present invention, comprises three sets of coils each of which are wound in associated tracks 86a, 86b, and 86c with each of the coils being insulated from one another and from the ring 58. The coils are also designated 86a, 86b, and 86c, respectively.

Each of the tracks 86a, 86b, and 86c is arranged in a circumferentially varying square wave pattern, separated from each of the other patterns by thirds so as to be offset by 120° electrical degrees (20° mechanical) from the other two patterns. Every sixty mechanical degrees, the patterns repeat.

Figure 7E:
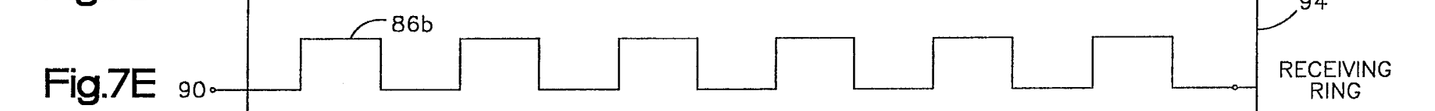
Figure 7F:
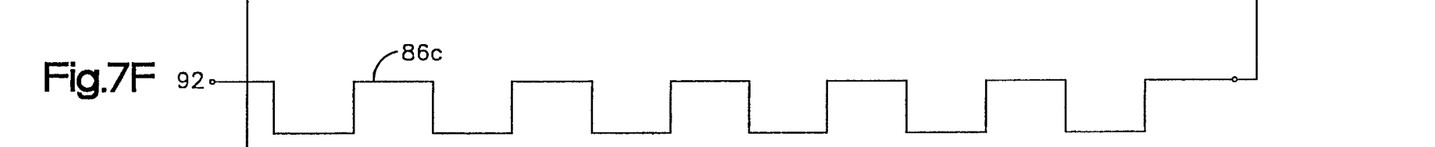

Referring to FIGS. 7D, 7E, and 7F, the outputs of each of the coils in tracks 86a, 86b, and 86c are depicted. These coils form square wave patterns 86a, 86b, 86c, respectively. The coil in track 86a has a connection terminal 88. The coils in tracks 86b and 86c have, respectively, connection terminals 90 and 92. The coils in tracks 86a, 86b, and 86c have a common connection terminal 94.

The slots 80 are circumferentially narrow and radially shallow to assure a sharp delineation of the magnetic field transmitted by the transmitting ring 56. There are thirty-six circumferentially equidistant slots, that is, one slot every 10°. In a preferred embodiment, the coils 86a, 86b, and 86c are each made with wire positioned in the slots 80 with a wire being placed in every third slot. The wire for coil 86a is placed in one slot 86a, runs along the edge of ring 58 until it reaches the next slot 86a where it runs up that next slot. The wire 86a, in effect, forms a square wave pattern in slots 56a around the entire circumference of ring 58. The same is true for 86b and 86c in their associated slots. The wires in the slots relative to the transmitter windings is shown in FIGS. 7D–7F.

Figure 7G:
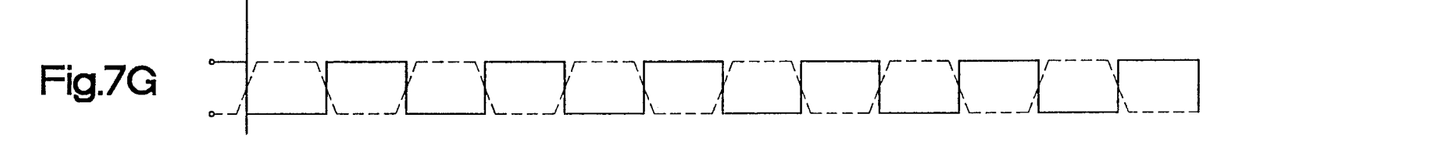

If a higher received signal strength is desired, the wire pattern shown in FIG. 7G can be used for each of the tracks. The dotted line corresponds to a return wire and effectively increases the turns ratio of the coil formed by the wire, thereby increasing the strength of the signal received by that coil.

Figure 6:
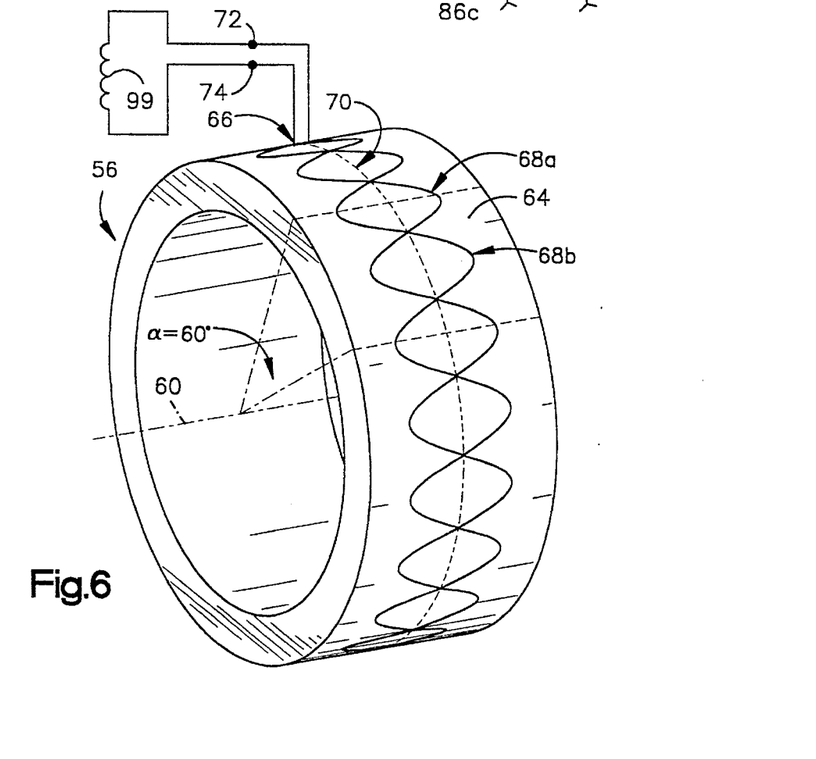
FIG. 6 is an isometric view of a portion of the position sensor shown in FIG. 4.
Figure 8:
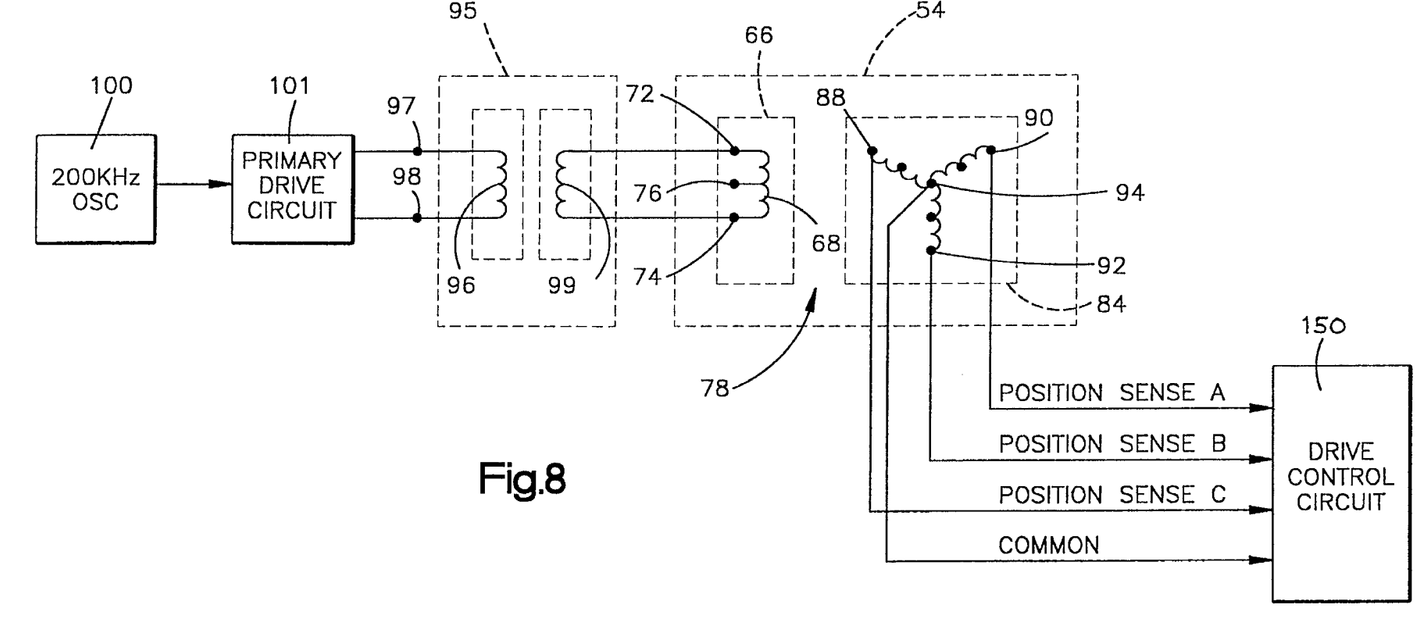
FIG. 8 is a schematic circuit diagram of the drive arrangement for the rotor position sensor of FIG. 4.

Referring to FIG. 5, the signal from the receiving coils 86 is accessible though stationary contacts 88, 90, 92 since the receiving ring 58 is secured to the stator. Since the transmitting ring 56 is secured to the rotor 38, the coil 68 is energized through a rotary transformer arrangement 95 (as shown in FIG. 8). A primary coil 96 is secured to the stator 32 and is electrically connected through terminals 97, 98. A secondary coil 99 is secured to the rotor 38 and is electrically connected to the transmitting coil 68 through terminals 72, 74 (FIG. 6). The primary coil 96 and secondary coil 99 are in sufficiently close proximity to each other so as to form the rotary transformer 95.

Referring to FIG. 8, the primary coil 96 is electrically connected to a signal generator 100 through a primary drive circuit 101. The drive signal applied to the rotary transformer 95 is a sinusoidal drive signal. The receiving coil 99 outputs a sinusoidal signal in response to the electromagnetic field transmitted by the transmitting coil 96. The transmitting coil 68 of the transmitting ring 56 is, in turn, driven with the 200 kHz sinusoidal drive signal. The receiving coils 86a, 86b, 86c each output a sinusoidal signal. The sinusoidal signals from the receiving coils 86a, 86b, 86c are offset from each other by 120 electrical degrees. The output signal from the receiving coils can be expressed as:

$$V1 = v\ \sin(\omega t)\sin(\alpha + 0)$$

$$V2 = v\ \sin(\omega t)\sin(\alpha + 120)$$

$$V3 = v\ \sin(\omega t)\sin(\alpha + 240)$$

where $\omega$ is the drive circuit frequency, $\alpha$ is the shaft angle in electro-mechanical degrees, t is the present time. The equations represent the value of the voltage present across the associated coil. The voltage V1 is the voltage across the coil 86a, and V2 and V3 are the voltages across the coils 86b and 86c, respectively.

The output of each receiving coil 86 goes through six cycles (360 electrical degrees) for each 360 mechanical degrees of relative rotation between the transmitting ring 56 and the receiving ring 58, or, equivalently, between the rotor and the stator. If the output of each receiving coil were to be observed, the output voltage amplitudes would follow a sine wave pattern and end at its starting terminal each 1/6th of a complete mechanical revolution between the stator and the rotor. Therefore, the voltage at the output of each receiving coil goes through 360 electrical degrees for each 60 degrees of mechanical rotation between the rotor and the stator.

The equations for V1, V2, and V3 provide three equations with three unknowns. As the transmitting ring 56 rotates relative to the receiving ring 58, such as occurs when the rotor moves relative to the stator, the values output from the three receiving coils vary. A controller 150 monitors the values output by each of the receiving coils 84. The controller 150 is preferably a microprocessor or microcomputer. At any instant in time t, the controller 150 can measure the value of the voltage present at the outputs of the receiving coils and solve the equations for $\alpha$. The solution of the equations for $\alpha$ represents the rotary position of the motor rotor relative to the stator. Knowing the position of the rotor relative to the stator permits the controller 150 to control commutation of the motor 26.

Referring back to FIG. 1, a position sensor 103 is operatively connected across the input shaft 16 and the pinion shaft 17 and provides an electrical signal having a value indicative of the relative rotational position between the input shaft and the pinion shaft. The position sensor 103 in combination with the torsion bar 18 form a torque sensor 110. The output of the position sensor is indicative of the applied steering torque to the vehicle steering wheel 12 by the vehicle operator.

The output of the torque sensor 110 is connected to an assist function circuit 111 that provides a desired torque value as a function of applied steering torque measured by the torque sensor 110. This functional relationship may be any one of several possible relationships with the goal of improving steering feel. In accordance with one embodiment, one functional relationship contemplated between the output of 111 and the input of applied steering torque is a "smile" curve. Other contemplate relationships include those disclosed in U.S. pending patent applications to McLaughlin Ser. No. 246,947 filed May 20, 1994 and U.S. patent application to McLaughlin et al. Ser. No. 212,112 filed Mar. 11, 1994, both of which are hereby fully incorporated herein by reference.

The output of the assist function circuit 111 is connected to a lead/lag filter 112. The lead/lag filter 112 processes the torque signal and separates it into a direction signal 114 and a magnitude signal 116. In processing the torque signal, the lead/lag filter 112 amplifies the value of torque signal.

The torque magnitude value 116 is converted to a torque command signal preferably by use of a torque look-up table 118 based upon the torque magnitude. Those skilled in the art will realize that filtering of the output of the torsion sensor signal may be distributed differently about the torque command table than is specifically shown and described. For example, the output of the assist function circuit 111 may be directly connected to the table 118 and the filtering occurring at the output of the table.

A vehicle speed sensor 119 is operatively connected to the vehicle and has an output 129. Speed sensor 119 provides a signal, hereinafter referred to as "s", having a value indicative of the vehicle's speed. Output 129 is operatively connected to a speed fold-back circuit 121 and a damping control circuit 220. Those skilled in the art appreciate that a vehicle speed sensor includes a device connected to the vehicle wheels or to the vehicle transmission that generates pulses at a frequency that is a function of the vehicle speed. The speed sensor further includes circuitry that converts the pulse frequency into a signal having a value indicative of the vehicle speed.

The output 129 of speed sensor 119 and the output from the torque command table 118 are combined in speed fold-back circuit 121. As is well known in the art, the amount of power assist desired for a vehicle steering system decreases as vehicle speed increases. Therefore, to maintain a proper or desirable feel to steering maneuvers, it is desirable to decrease the amount of steering power assist as the vehicle speed increases. The output 126 of the speed fold-back circuit is a torque command signal that is "corrected" as a function of vehicle speed.

The output 126 is connected to a soft start control circuit 130. The soft start control circuit 130 is also operatively connected to the vehicle ignition switch 132 for detection of when the vehicle is first started. The purpose of the soft start control circuit is to prevent full assist from being provided to the vehicle the instant the vehicle is being started. It is not uncommon for the vehicle operator to be applying torque to the steering wheel with one hand while he is turning the ignition switch to the starting position. If full power assist were immediately available, the steering wheel would jerk in his hand. The soft start circuit prevents this unpleasant event from happening and simulates the operation of a hydraulic power assist steering system which does not provide full power assist until the vehicle motor is running at speed (as opposed to cranking speed).

The output of the soft start circuit, after an initial time delay for starting of the vehicle, is the torque demand or request signal "corrected" for vehicle speed. The output of the soft start circuit is connected to a thermal and current fold-back circuit 138. A system temperature sensor circuit 180 monitors temperature of the circuitry used to control the electric assist motor 26. A motor current sensor 190 monitors current through the motor and outputs a signal to the thermal and current fold-back circuit 138 indicative of the sensed current through the motor 26. The thermal and current fold-back circuit 138 further modifies the torque request signal as a function of the sensed current through the motor and the sensed temperature of the control circuitry. The output of the fold-back circuit 138 is connected to the torque command and direction circuit 140. The direction signal 114 is also connected to the torque command and direction circuit 140. The circuit 140 recombines the torque direction signal with the torque request signal that has been "corrected" for (i) vehicle speed, (ii) soft start, (iii) sensed motor current, and (iv) sensed temperature of the control circuitry. The output of the torque command and direction circuit 140 is connected as one input of a summing circuit 142. The output of the torque command and direction circuit 140 is also connected as one input of a damping control circuit 220.

The output of the summing circuit 142 is connected to the input of a drive control circuit 150. The output of the motor position sensor 54 is also connected to the drive control circuit 150. Based upon the torque command signal output from the summing circuit 142 and based upon the position of the rotor, the drive control circuit 150 provides a motor control signal used to control energization of the electric assist motor 26 in terms of sequence and current applied to the stator coils through a plurality of power switches 154.

The drive control circuit 150 is preferably is a microcomputer. Commutation or drive pulses may need to be output to the stator windings at a rate faster than the motor position data can be processed from the sensor 54 to insure smooth operation of the variable reluctance motor. To solve this problem, the position of the rotor can be estimated at predetermined times between actual rotor position measurements based upon certain known conditions and certain assumptions. Rotor position estimation is described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A Lumsdaine, J. H. Lang, and M. J. Balas, 19th ASILOMAR Conference on Circuits, Systems & Computers, Nov. 6–8, 1985, both papers being hereby fully incorporated herein by reference.

Figure 9:
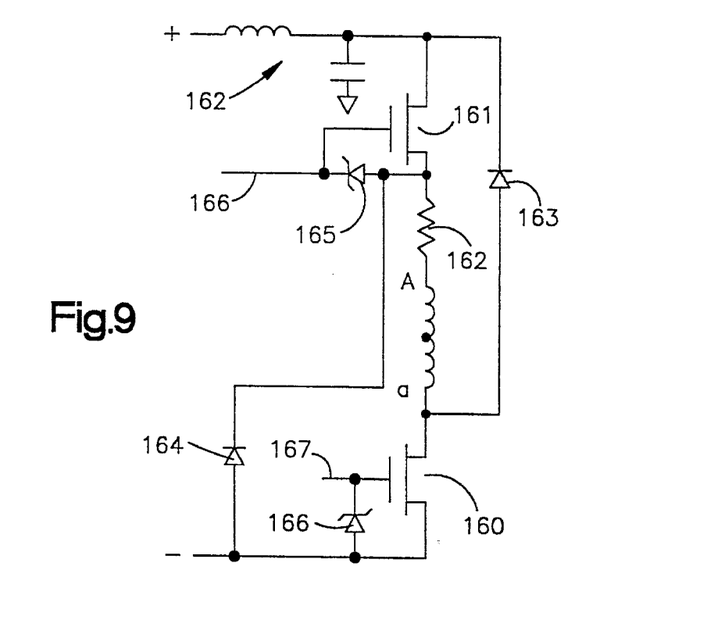
FIG. 9 is a schematic circuit diagram of the power switch shown in FIG. 1.

Referring to FIG. 9, a typical drive circuit is shown for a pair of the stator coils Aa. Each of the other motor phases have similar drive circuits. The first drive switch 160 is operatively connected between one side of the stator coil and electrical ground. A second drive switch 161 is connected to the other side of the coil pair Aa through a current sense resistor 162. The other side of the switch 161 is connected to the vehicle battery through an LC filter network 162. A first fly-back diode 163 is connected between one terminal of the motor and the LC filter 162. A second fly-back diode 164 is connected between ground and the switch 161. An over-voltage protection Zener diode 165 is connected across switch 161. An over-voltage protection Zener diode 166 is connected across switch 160. Preferably, switches 160, 161 are solid state switches such as field-effect-transistors ("FET's"). Current control is accomplished by the drive control circuit 150 pulse-width-modulating ("PWM") the switches 160, 161 on control lines 166, 167.

The output from the rotor position sensor 54 is also connected to a motor velocity sensor circuit 200. The change in the rotor position as a function of time is indicative of the rotor and, in turn, the motor velocity. The output of the motor velocity sensing circuit 200 is an electric signal having a value indicative of the motor speed and sign, i.e. direction, of rotation. Rather than differentiating the rotor position, i.e., change in rotor position as a function of time, those skilled in the art will appreciate that other velocity sensing arrangements could be used to determine rotor speed and direction of rotation such as a tachometer connected to the rotor or a curve fitting arrangement using look-up tables.

Velocity sensor 200 has an output 201 connected to (i) damping control circuit 220 and (ii) a multiplier circuit 210. The output 201 of sensor 200 provides a signal, hereinafter also referred to as $W_m$, indicative of motor velocity. The motor velocity signal $W_m$ has both a magnitude component and a direction of rotation component.

Damping control circuit 220 has an output 221 which provides a damping control signal, hereinafter also referred to as $K_D$. The damping control signal $K_D$ has a value functionally related to the value of the sensed motor velocity and the value of the sensed vehicle speed. The output 221 of damping control circuit 220 is connected as a second input of multiplier circuit 210.

Multiplier circuit 210 has an output 211 and provides a retarding torque signal, hereinafter also referred to as $R_\gamma$. Retarding torque signal $R_\tau$ is functionally related to damping control signal $K_D$ and motor velocity signal $W_m$. The relationships between $R_\tau$, $K_D$ and $W_m$ may be expressed by the following equations;

$$R_\tau = K_D \times W_m$$

The damping control signal $K_D$ may be expressed as $$K_D = [K_{d1}(s)] \times [K_{d2}(W_m)]$$

were s=vehicle speed, $W_m$=motor velocity, $K_{d1}(s)$ is the vehicle speed damping factor, and $K_{d2}(W_m)$ is the assist motor velocity damping factor. These last two damping factors may be expressed as $$K_{d1}(s) = A_1(s) + B_1$$

$$K_{d2}(W_m) = A_2(W_m) + B_2$$

$A_1$, $A_2$, $B_1$, and $B_2$ are constants that are stored in a look-up table. These values can be empirically determined for a particular vehicle platform to achieve a desired "steering feel." The retarding torque $R_\tau$ value output from the multiplier 210 is the negative input to the summing circuit 142.

Figure 10:
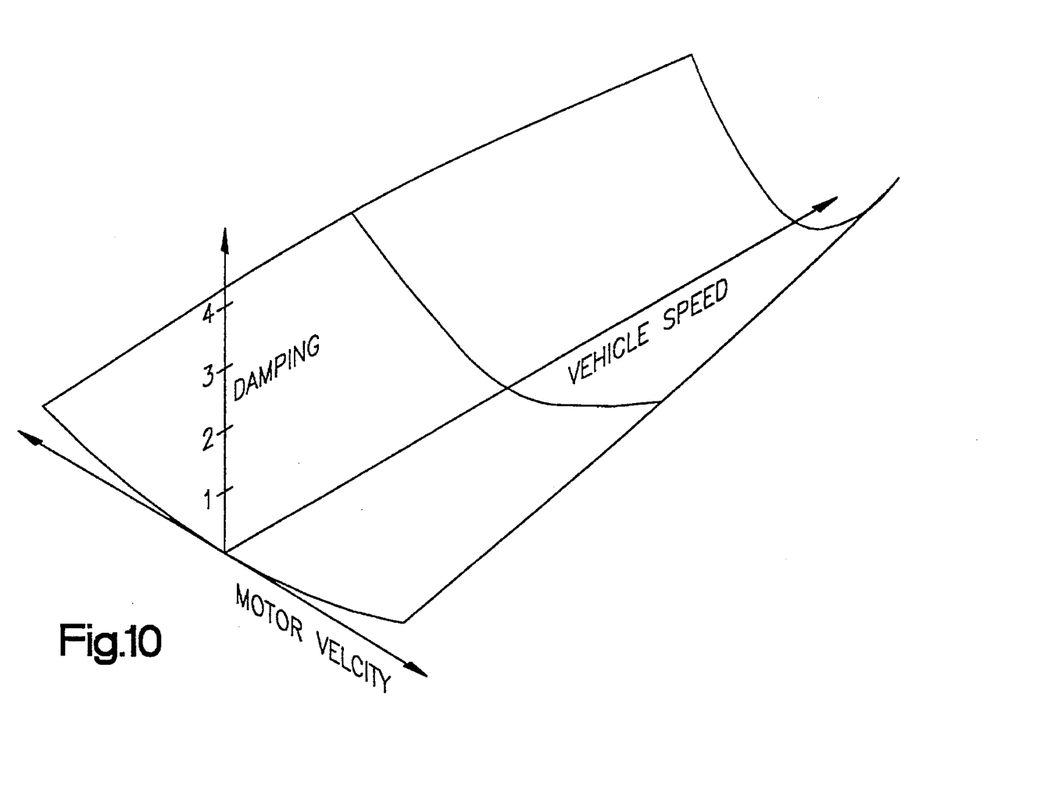
FIG. 10 is a graphical representation of the damping characteristic of the present invention as a function of vehicle speed and motor velocity.

Referring to FIG. 10, a non-linear function of retarding torque is depicted in accordance with one embodiment of the invention. For a low vehicle speed and low motor velocity, the resultant damping term output from the multiplier 211 is low. As vehicle speed remains low and motor velocity increases, the resultant damping output value from the multiplier 211 increases. As both vehicle speed and motor velocity increase, the damping value increases in an increasing parabolic fashion.

When a vehicle is in a steering maneuver, i.e., the steering wheel and the steerable wheels are turned while the vehicle is traveling, road forces and caster of the steerable wheels tend to return the steerable wheels to a straight-ahead position. In an electric assist steering system, damping is the amount of retarding force which opposes the electric assist motor rotation. If the damping is equal to zero, there is no retarding torque applied to the electric assist motor. Without retarding torque applied to the electric assist motor, there is less resistance to turning the steerable wheels or returning the steerable wheels to the straight-ahead position after a turning maneuver. If the vehicle is traveling at a high rate of speed and the damping is zero, the vehicle may become unstable resulting in increasing yaw rate of the vehicle and "spinning-out."

The damping of the vehicle yaw by control of the electric assist steering, in accordance with the present invention, is functionally related to both the sensed vehicle speed and the sensed velocity of the power assist motor in a non-linear manner. As the vehicle speed increases, the damping value output from the circuit 220 increases. The output 201 from sensor circuit 200 is providing a signal value indicative of how fast the steerable wheels are turning in a turning maneuver or returning to the straight-ahead position after a turning maneuver. The faster the steerable wheels are turning or returning toward center, the greater the damping. Based on vehicle steering system geometry, other damping coefficient calibration may be desirable for good "feel." The amount of retarding torque $R_\tau$ applied to the assist motor may vary depending on the desired "steering feel" of the vehicle. For example, a different "steering feel" or retarding torque may be desired for a turning maneuver than the "steering feel" or retarding torque during a return of the steerable wheels to a straight-ahead position.

Figure 11:
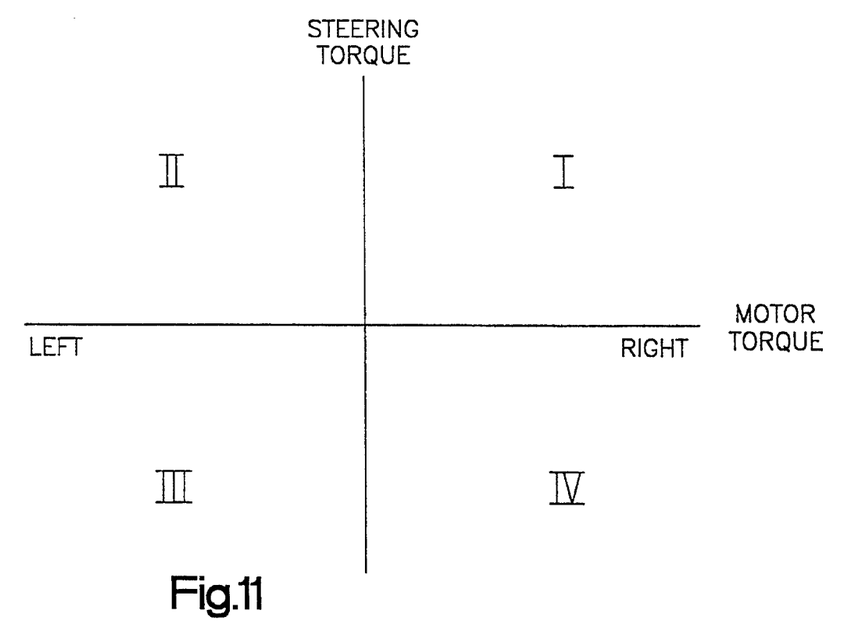
FIG. 11 is a depiction of steering torque and motor torque divided into four quadrants of operation for a steering assist system.

Referring to FIG. 11, applied steering torque versus motor torque is divided into four quadrants. The X-axis shows the direction of motor torque. The Y-axis shows the direction of the steering torque applied to the steering wheel. Positive values for both direction of motor torque and direction of applied steering torque defines Quadrant I. A negative value for the direction of motor torque and a positive value for the direction of steering torque defines Quadrant II. Negative values for both motor torque and direction of applied steering torque defines Quadrant III. A positive value for the direction of motor torque and a negative value for applied steering torque defines Quadrant IV.

Different values of retarding torque may be desired depending upon which quadrant the power assist steering system 10 is operating. For example, when the vehicle power assist steering system 10 is operating in Quadrants I and III, lower damping may be desired. This is because damping is a retarding torque which decreases the assist provided by the electric assist motor. Greater assist is desired during a turning maneuver than during a return of the steerable wheels to a straight-ahead position. When the power assist steering system 10 is operating in Quadrants II and IV, indicating a return of the steerable wheels to a straight-ahead position, higher damping may be desired. This is because the retarding torque stabilizes yaw rate, as described above.

The different levels of retarding torque may be obtained by providing more than one look-up table having values for the constants $A_1$, $A_2$, $B_1$, and $B_2$. A first table, having values for the constants $A_1$, $A_2$, $B_1$, and $B_2$ may be provided when the power assist steering system is operating in Quadrants I and III. A second table, having relatively higher values for the constants than the values in the first table may be provided when the system is operating in Quadrants II and IV. The higher values for the constants $A_1$, $A_2$, $B_1$, and $B_2$ provides higher damping factors and increases the retarding torque applied to the assist motor.

Figure 12:
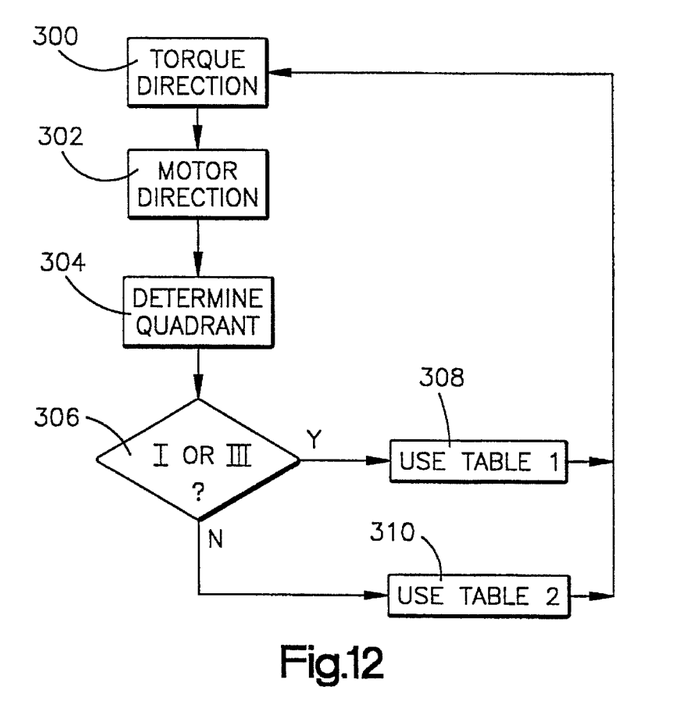
FIG. 12 is a flow chart illustrating a control process of the present invention.

Referring to FIG. 12, the control process for the selection between tables containing the values of the constants $A_1$, $A_2$, $B_1$, and $B_2$ of the present invention will be better appreciated. In step 300, the steering torque direction is determined. Torque command and direction circuit 140 provides the applied steering torque direction to damping control circuit 220. The process then proceeds to step 302 where direction of motor torque is determined.

Motor velocity sensor 200 provides a signal to damping control circuit 220 indicating the direction of rotation of motor 26. It will be appreciated that velocity has both a magnitude component and a direction component. The direction of rotation of motor 26 is functionally related to the direction of movement of the steerable wheels. The process then proceeds to step 304.

In step 304, a determination is made in damping control circuit 220 as to which quadrant the power assist steering system 10 is operating. In step 306, a determination is made as to whether the power assist steering system is operating in Quadrants I or III. If the determination in step 306 is affirmative, i.e. the power assist steering system is engaged in a turning maneuver and is operating in either Quadrant I or III, the process proceeds to step 308. In step 308, the first table of values for constants $A_1$, $A_2$, $B_1$, and $B_2$ is selected to determine the values of the damping factors $K_{d1}(s)$, the vehicle speed damping factor, and $K_{d2}(W_m)$, the assist motor velocity damping factor. The process then returns to step 300.

If the determination in step 306 is negative, i.e. the power assist steering system is engaged in a return of the steerable wheels to a straight-ahead position and is operating in either Quadrant II or IV, the process proceeds to step 310. In step 310, the second table of values for constants $A_1$, $A_2$, $B_1$, and $B_2$ is selected to determine the values of the damping factors $K_{d1}(s)$, the vehicle speed damping factor, and $K_{d2}(W_m)$, the assist motor velocity damping factor. The process then returns to step 300.

One skilled in the are will appreciate that the values for the damping factors $K_{d1}(s)$, $K_{d2}(W_m)$ and, therefore, the value of the retarding torque can be controlled by providing only one look-up table for the constants $A_1$, $A_2$, $B_1$, and $B_2$.

It should be further appreciated that damping, in accordance with the present invention, is non-linear. One would like an electric assist system to at least simulate the feel of a hydraulic assist system. The present arrangement not only simulates the feel of a hydraulic assist system at low speeds, it provides an improved handling stability at all vehicle speeds, especially at speeds greater than 55 mph or less than 10 mph.

It should further be appreciated that it is desirable to include self-diagnostic features in the drive control circuit to insure proper operation of the power assist arrangement. Such a diagnostic arrangement for electric assist steering systems is fully described in U.S. Pat. No. 4,660,671 to Behr et al., assigned to TRW Inc., and which is hereby fully incorporated herein by reference.

The control arrangement depicted in FIG. 1 shows modification of the torque signal in summing circuit 142 by the values of (i) the damping from circuit 220 (vehicle speed "s" and motor velocity $W_m$) and (ii) motor velocity $W_m$ from motor velocity sensor 200. Modifying the torque signal results in modifying the motor control signal output of the drive control circuit 150.

Many of the functions depicted in FIG. 1 may be embodied in discrete circuitry, a microcomputer, or in an application specific integrated circuit ("ASIC").

From the above description of a preferred embodiment of the invention, those skilled in the art will perceive improvements, changes, and modifications. Such improvements, changes, and modifications within the skill of the art are intended to be covered by the appended claims.

Having described a preferred embodiment of the invention, the following is claimed:

1. An electric assist steering system, comprising:

torque sensor means for sensing applied steering torque and providing a steering torque signal in response thereto;

means for providing a torque demand signal having a value functionally related to said applied steering torque;

an electric assist motor operatively connected to a steering member for, when energized, providing power assist steering;

means for providing a motor control signal in response to said torque demand signal;

motor speed sensor means for sensing speed of said electric assist motor and for providing a motor speed signal indicative thereof; and means for modifying said motor control signal in response to said motor speed signal so as to provide non-linear damping of power assist provided by said electric assist motor as a function of said motor speed signal.

2. The electric assist steering system of claim 1 wherein said electric assist motor is a variable reluctance motor.

3. The electric assist steering system of claim 1 wherein said motor includes a rotor and a stator and wherein said motor speed sensing means includes means for sensing a relative position between said rotor and said stator.

4. The electric assist steering system of claim 3 wherein said motor speed sensing means further includes means for sensing a direction of rotation of said motor and wherein said modifying means further modifies said motor control signal in response to said sensed direction.

5. An electric assist steering system, comprising:

torque sensor means for sensing applied steering torque and providing a signal indicative thereof;

means for providing a torque demand signal having a value in response to said sensed applied steering torque;

an electric assist motor operatively connected to a steering member for, when energized, providing power steering assist;

means for sensing vehicle speed and for providing an electric signal having a value indicative of vehicle speed;

means for providing a motor control signal in response to said torque demand signal and said sensed vehicle speed;

motor speed sensor means for sensing speed of said electric assist motor and for providing a motor speed signal indicative thereof; and means for modifying said motor control signal in response to said motor speed signal and said sensed vehicle speed so as to provide damping of the power steering assist provided by said electric assist motor as a non-linear function of said sensed motor speed and sensed vehicle speed for vehicle yaw rate control during a steering maneuver.

6. The apparatus of claim 5 wherein said means for modifying said motor control signal further includes means for increasing said damping as vehicle speed increases.

7. The electric assist steering system of claim 5 wherein said electric assist motor is a variable reluctance motor.

8. The electric assist steering system of claim 5 wherein said motor speed sensing means further includes means for sensing a direction of rotation of said rotor and wherein said modifying means further modifies said motor control signal in response to said sensed direction.

9. An electric assist steering system, comprising:

torque sensor means for sensing applied steering torque and providing a steering torque signal having a value indicative thereof;

means for providing a torque demand signal having a value functionally related to said sensed applied steering torque;

an electric assist variable reluctance motor operatively connected to a steering member for, when energized, providing power assist to said steering member, said variable reluctance motor having a stator and rotor;

means for providing a motor control signal in response to said value of said torque demand signal for control of said variable reluctance motor;

motor speed sensor means for sensing speed of the assist motor and for providing a motor speed signal indicative thereof;

vehicle speed sensing means for sensing vehicle speed and for providing a vehicle speed signal indicative thereof; and means for modifying said motor control signal in response to said motor speed sensor signal and said vehicle speed signal so as to provide non-linear damping of the power assist provided by said assist motor for vehicle yaw rate control.

10. A method for controlling an electric assist steering system, comprising the steps of:

sensing applied steering torque and providing a steering torque signal in response thereto;

providing a torque demand signal having a value functionally related to said applied steering torque;

providing an electric assist motor operatively connected to a steering member for, when energized, providing power assist steering;

providing a motor control signal in response to said torque demand signal for control of said motor;

sensing speed of said electric assist motor and for providing a motor speed signal indicative thereof; and modifying said motor control signal in response to said motor speed signal so as to provide non-linear damping of the power assist provided by said electric assist motor.

11. A method for controlling an electric assist steering system, comprising the steps of:

sensing applied steering torque and providing a signal indicative thereof;

providing a torque demand signal having a value functionally related to said sensed applied steering torque;

providing an electric assist motor operatively connected to a steering member for, when energized, providing power steering assist;

sensing vehicle speed for providing an electric signal having a value indicative of vehicle speed;

providing a motor control signal in response to said torque demand signal and said sensed vehicle speed for control of said motor;

sensing speed of said electric assist motor and for providing a motor speed signal indicative thereof; and modifying said motor control signal in response to said motor speed signal and said sensed vehicle speed so as to provide damping of the power assist provided by said motor as a non-linear function of said sensed motor speed and sensed vehicle speed for vehicle yaw rate control during a steering maneuver.

12. A method for controlling an electric assist steering system, comprising the steps of:

sensing applied steering torque and providing a steering torque signal having a value indicative thereof;

determining a torque demand signal having a value functionally related to said sensed steering torque;

providing an electric assist variable reluctance motor operatively connected to a steering member for, when energized, providing power assist to said steering member, said variable reluctance motor having a stator and rotor;

providing a motor control signal in response to said value of said torque demand signal for control of said variable reluctance motor;

sensing speed of the power assist motor and for providing a motor speed signal indicative thereof;

sensing vehicle speed and providing a vehicle speed signal indicative thereof; and modifying said motor control signal in response to said motor speed sensor signal and said vehicle speed signal so as to provide non-linear damping of the power assist provided by said motor for vehicle yaw rate control.

* * * * *